US008866959B2

(12) United States Patent
Ogino et al.

(10) Patent No.: US 8,866,959 B2
(45) Date of Patent: Oct. 21, 2014

(54) IMAGING APPARATUS AND CAMERA BODY INCLUDING A NORMALLY OPEN TYPE SHUTTER HAVING A FULL OPEN STATE

(75) Inventors: Yushi Ogino, Hyogo (JP); Hiroshi Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 13/512,201

(22) PCT Filed: Nov. 22, 2010

(86) PCT No.: PCT/JP2010/006825
§ 371 (c)(1),
(2), (4) Date: May 25, 2012

(87) PCT Pub. No.: WO2011/064980
PCT Pub. Date: Jun. 3, 2011

(65) Prior Publication Data
US 2012/0274835 A1    Nov. 1, 2012

(30) Foreign Application Priority Data

Nov. 30, 2009   (JP) ................................. 2009-271377

(51) Int. Cl.
| | |
|---|---|
| *H04N 5/235* | (2006.01) |
| *G03B 7/00* | (2014.01) |
| *H04N 5/232* | (2006.01) |
| *G03B 9/14* | (2006.01) |
| *G03B 9/42* | (2006.01) |
| *H04N 5/238* | (2006.01) |
| *G03B 17/14* | (2006.01) |
| *G03B 7/091* | (2006.01) |
| *G03B 13/36* | (2006.01) |

(52) U.S. Cl.
CPC . *G03B 9/42* (2013.01); *G03B 17/14* (2013.01); *G03B 7/091* (2013.01); *G03B 2206/00* (2013.01); *H04N 5/23212* (2013.01); *G03B 9/14* (2013.01); *H04N 5/238* (2013.01); *G03B 13/36* (2013.01)
USPC .......................................... 348/362; 348/349

(58) Field of Classification Search
CPC ... H04N 5/235; H04N 5/238; H04N 5/23212; G03B 9/14; G03B 9/42; G03B 13/36; G03B 7/00091; G03B 17/14; G03B 2206/00
USPC ......... 348/207.99, 229.1, 294, 296, 297, 312, 348/362–368, 345–356; 396/63–70, 121, 396/213–262, 484, 489; 352/141; 250/214 AL
See application file for complete search history.

(56) References Cited

U.S. PATENT DOCUMENTS

| | | | | |
|---|---|---|---|---|
| 5,563,677 A | * | 10/1996 | Muramatsu et al. | 396/121 |
| 5,758,213 A | * | 5/1998 | Goto et al. | 396/235 |

(Continued)

FOREIGN PATENT DOCUMENTS

| | | |
|---|---|---|
| JP | 63-96641 | 4/1988 |
| JP | 11-15039 | 1/1999 |

(Continued)

OTHER PUBLICATIONS

International Search Report of PCT Application No. PCT/JP2010/006825 dated Dec. 28, 2010.

(Continued)

*Primary Examiner* — Dennis Hogue
(74) *Attorney, Agent, or Firm* — Panasonic Patent Center

(57) ABSTRACT

An interchangeable lens including a focus lens for collecting subject light, an imaging sensor operable to generate an image signal based on the subject light, a shutter device that is arranged between the interchangeable lens and the imaging sensor and includes a first curtain and a second curtain, a pulse counter operable to detect positions of the first curtain and the second curtain, and a body controller operable to start capturing of a signal from the imaging sensor based on the positions of the first curtain and the second curtain detected by the pulse counter are provided.

6 Claims, 8 Drawing Sheets

(56) References Cited

U.S. PATENT DOCUMENTS

| | | | |
|---|---|---|---|
| 6,933,980 B1* | 8/2005 | Matsumoto | 348/363 |
| 7,628,550 B2 | 12/2009 | Okumura | |
| 2005/0063698 A1* | 3/2005 | Usuda et al. | 396/489 |
| 2005/0110894 A1* | 5/2005 | Hiramatsu | 348/362 |
| 2006/0087573 A1* | 4/2006 | Harada | 348/294 |
| 2007/0253700 A1 | 11/2007 | Okumura | |
| 2008/0252768 A1* | 10/2008 | Suzuki | 348/312 |
| 2011/0103788 A1* | 5/2011 | Kim | 396/484 |
| 2011/0122287 A1* | 5/2011 | Kunishige et al. | 348/229.1 |

FOREIGN PATENT DOCUMENTS

| | | |
|---|---|---|
| JP | 2000-81648 | 3/2000 |
| JP | 2005-94469 | 4/2005 |
| JP | 2006-292912 | 10/2006 |
| JP | 2007-298741 | 11/2007 |
| JP | 2007-312198 | 11/2007 |
| JP | 2008-28997 | 2/2008 |
| JP | 2008-28998 | 2/2008 |
| JP | 2008-141675 | 6/2008 |
| JP | 2009-198629 | 9/2009 |

OTHER PUBLICATIONS

Translation of the International Preliminary Report on Patentability (PCT/IB/338) mailed on Jul. 19, 2012 with PCT/IB/373 & PCT/ISA/237 for corresponding application PCT/JP2010/006825.

* cited by examiner

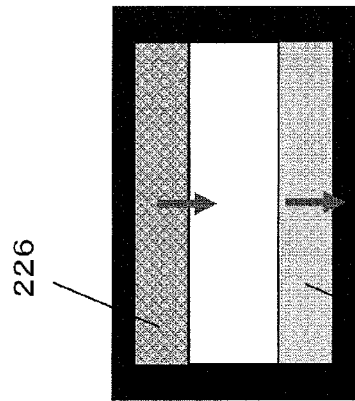
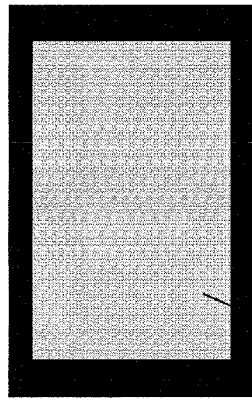
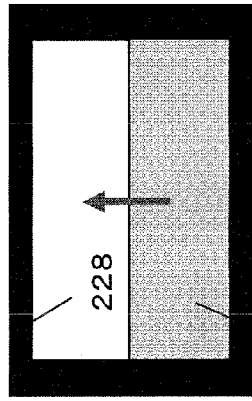
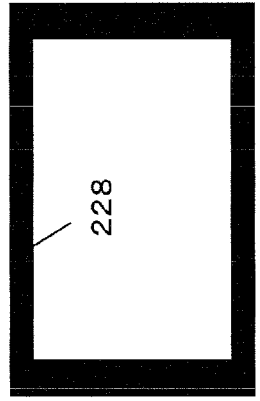
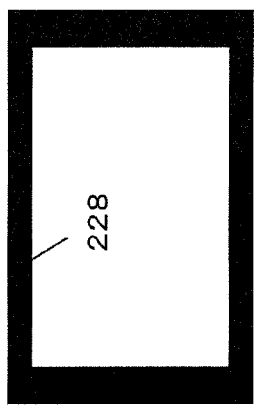
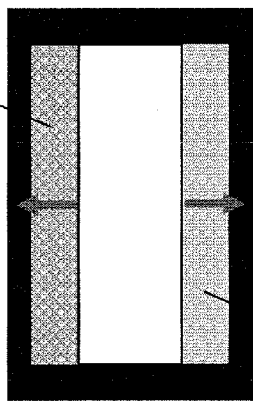
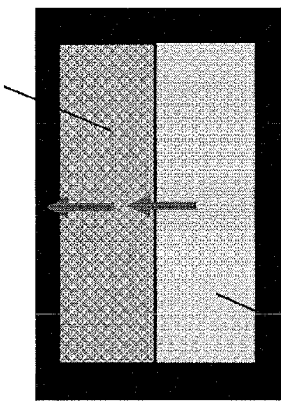
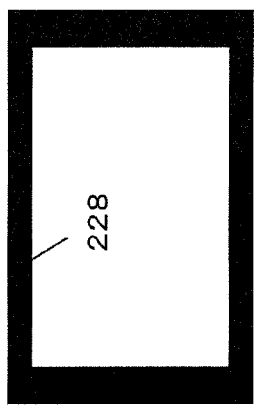

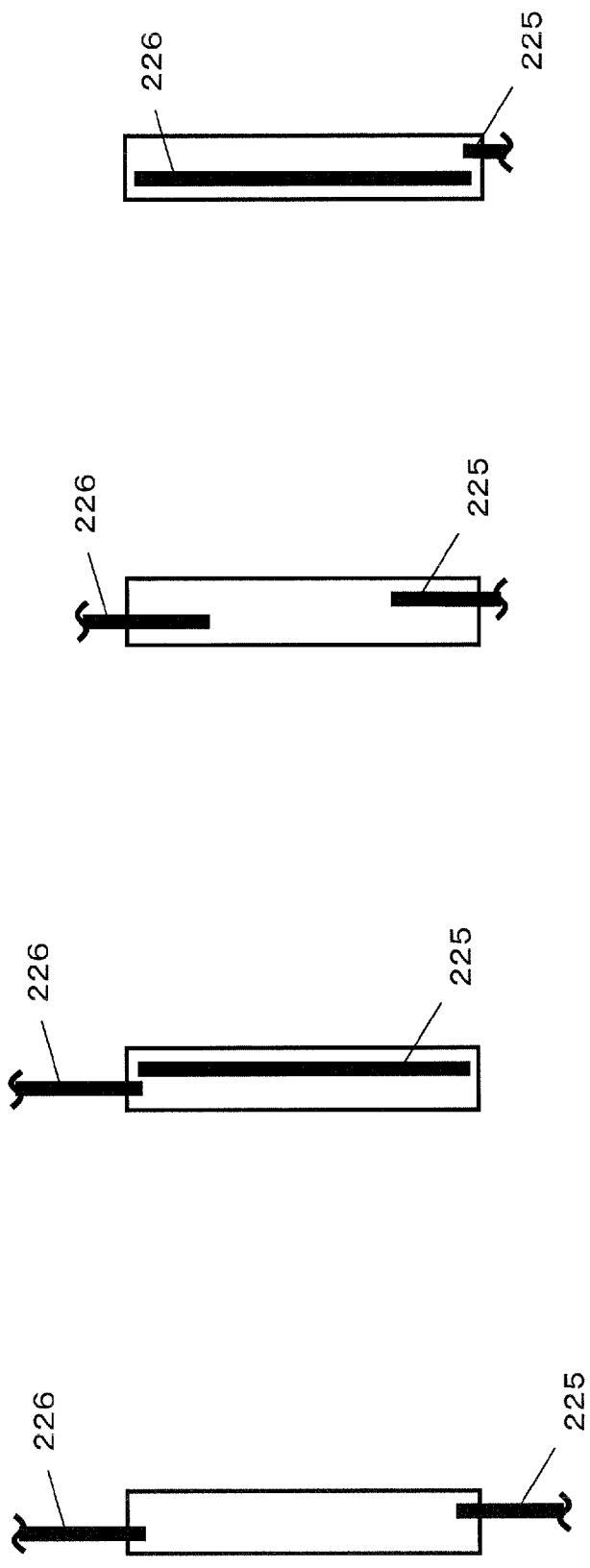

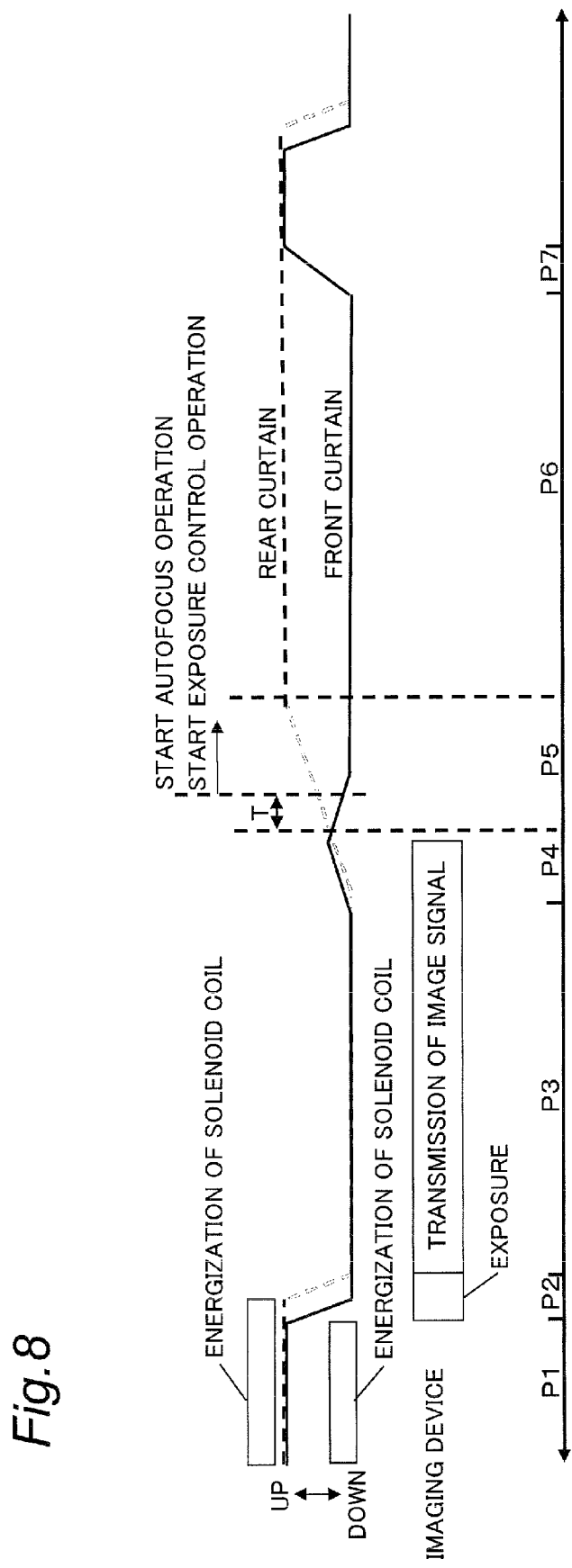

IMAGING APPARATUS AND CAMERA BODY INCLUDING A NORMALLY OPEN TYPE SHUTTER HAVING A FULL OPEN STATE

TECHNICAL FIELD

The present invention relates to an imaging apparatus for capturing a subject and generating image data.

BACKGROUND ART

An imaging apparatus that contains an imaging sensor and captures a subject to generate image data has become noticeably common. As such an imaging apparatus, an imaging apparatus in which an optical system and a body is integrated has become common. However, high quality image data requires more, and an imaging apparatus in which an optical system can be separated from a body has also started to become widespread.

An original imaging apparatus in which the optical system can be separated from the body is a film type single-lens reflex camera. An imaging apparatus having an image sensor instead of the film is a digital single-lens reflex camera. As generally known, the body of the digital single-lens reflex camera is provided with a movable mirror similarly to the film type single-lens reflex camera. The movable mirror is normally arranged on an optical path of subject light incident via an interchangeable lens and guides the subject light to an optical finder. The movable mirror leaves the optical path so as to lead the subject light to the imaging sensor only at the time of shooting an image. Therefore, in the digital single-lens reflex camera, a user observes subjects via the optical finder and determines composition.

A user, who has used a so-called compact digital camera of which an optical system and a body are integral, is used to determining composition while observing a large-size liquid crystal display monitor provided on a rear surface of the body. Such a user is frequently not used to the optical finder to be viewed.

Therefore, a digital single-lens reflex camera having the movable mirror arranged in the body has emerged. In the camera, the movable mirror is allowed to leave the optical path so that subject image can be displayed on the large-size liquid crystal display monitor provided on the rear surface of the body even in cases other than shooting an image. A function for displaying subject image on the large-size liquid crystal display monitor provided on the rear surface of the body is occasionally referred to as "a live view function".

However, the digital single-lens reflex camera adopts a normally closed shutter that is open only at the time of shooting an image. Therefore, the normally closed shutter should be maintained opened in order to realize the live view function, thus resulting in large power consumption.

Therefore, a digital single-lens camera that does not have the movable mirror in a body and adopts a normally open shutter has emerged. Hereinafter such a digital single-lens camera is referred to as "a digital single-lens camera", in which "reflex" meaning an reflex mirror is eliminated in order to discriminate it from the digital single-lens reflex camera having the movable mirror. With the digital single-lens camera, subject can be always observed through the large-size liquid crystal display monitor provided on the rear surface of the body similarly to the compact digital camera. Since the digital single-lens camera is not provided with the movable mirror, the digital single-lens camera cannot be provided with the optical finder in the body. In the daytime outside, observation of a subject via the liquid crystal display monitors provided on the rear surface of the body is occasionally obstructed. In case of such a situation, the digital single-lens camera is sometimes provided with a looking-through type electronic finder. Since the digital single-lens camera does not have the movable mirror, the body can be extremely miniaturized. Further, since the normally open shutter can maintain the opened state if power is not supplied thereto, the power consumption is reduced.

Patent Documents 1 and 2 disclose digital single-lens reflex cameras having the live view function.

PRIOR ART DOCUMENTS

Patent Documents

Patent Document 1: JP-A-2008-028997
Patent Document 2: JP-A-2008-028998

DISCLOSURE OF INVENTION

Problems to be Solved by the Invention

Both the digital single-lens reflex camera adopting the normally closed shutter and the digital single-lens camera adopting the normally open shutter have a problem such that it is difficult to increase a number of shot images within a predetermined time at continuous shooting in the live view state, namely, improve a continuous shooting speed. This point will be simply described by exemplifying the digital single-lens camera adopting the normally open shutter (focal plane shutter).

In the live view state, a first curtain is housed in a lower portion of the normally open shutter, and a second curtain is housed in an upper portion of the normally open shutter, so that a normally open shutter is in an opened state.

When a shutter button is half-pressed, a main body starts an autofocus operation and an exposure control operation. A digital single-lens camera that does not have a movable mirror in a main body cannot adopt a phase difference detecting system for the autofocus operation. Therefore, the autofocus operation of a contrast detecting system is performed based on an image signal output from an imaging sensor. Further, when the main body does not have an independent exposure meter, the exposure control operation is also performed based on an image signal output from the imaging sensor.

When a shutter button is full-pressed, the first curtain is charged so that an opening of the normally open shutter is shielded. Afterwards, the first curtain and the second curtain run with a constant gap being provided so that exposure time is set. Thereafter, the opening of the normally open shutter is shielded by the second curtain until reading of an image signal from the imaging sensor is completed.

When the reading of the image signal from the imaging sensor is completed, the second curtain is housed in the upper portion of the normally open shutter. At this time, after the first curtain follows the second curtain to transfer towards the upper portion of the normally open shutter, the first curtain turns and transfers along the way to transfer towards the lower portion of the normally open shutter to be housed in the lower portion of the normally open shutter. As a result, the first curtain and the second curtain are opened near a center of opening in a vertical direction so that the normally open shutter transits from a closed state to an opened state. When the normally open shutter is again brought into the opened state, the main body starts the autofocus operation and the exposure control operation for next shooting of an image.

The digital single-lens camera adopting the normally open shutter should once bring the normally open shutter into the opened state before second shooting is carried out after first shooting is completed to perform the autofocus operation and the exposure control operation. For this reason, it is difficult to improve the continuous shooting speed.

Further, in a digital single-lens reflex camera adopting the normally closed shutter, when the autofocus operation is performed by the contrast detecting system in the live view state, the normally closed shutter should be once brought into the opened state. Further, when the digital single-lens reflex camera adopting the normally closed shutter can perform only the autofocus operation according to the phase difference detecting system, the movable mirror is transferred onto the optical path every time of shooting an image so that subject light is partially guided to a phase difference sensor. Thereafter, the movable mirror is allowed to leave and then the exposure time should be set. For this reason, it is difficult to improve the continuous shooting speed.

It is an object of the present invention to solve the above problem and improve the continuous shooting speed in an imaging apparatus that adopts a focal plane shutter and performs the autofocus operation of the contrast detecting system and the exposure control operation based on an image signal.

Means for Solving Problem

A first aspect provides an imaging apparatus including an optical system operable to collect subject light, an imaging sensor operable to generate an image signal based on the subject light, a shutter device arranged between the optical system and the imaging sensor, the shutter device including a first curtain and a second curtain, a position detector operable to detect positions of the first curtain and the second curtain, and a controller operable to start capturing of the image signal from the imaging sensor based on the positions of the first curtain and the second curtain detected by the position detector before the shutter device is fully opened.

In this configuration, capturing of a signal from an imaging sensor can be started without waiting for the shutter device to be in a full open state. Therefore, an autofocus operation of a contrast system or an exposure control operation can be started based on the signal captured from the imaging sensor without waiting for the shutter device to be in the full open state.

A second aspect provides an imaging apparatus including an optical system operable to collect subject light, the optical system including a focus lens, an imaging sensor operable to generate an image signal based on the subject light, a shutter device arranged between the optical system and the imaging sensor, the shutter device including a first curtain and second curtain, a position detector operable to detect positions of the first curtain and the second curtain, a focus unit operable to drive the focus lens based on the image signal, and a controller operable to operate the focus unit based on the positions of the first curtain and the second curtain detected by the position detector before the shutter device is fully opened.

In this configuration, an autofocus operation can be started by a focus unit without waiting for the shutter device to be in a full open state.

A third aspect provides an optical system operable to collect subject light, an imaging sensor operable to generate an image signal based on the subject light, a shutter device arranged between the optical system and the imaging sensor, the shutter device including a first curtain and a second curtain, a position detector operable to detect positions of the first curtain and the second curtain, an exposure determining unit operable determine exposure based on the image signal, and a controller operable to operate the exposure determining unit based on the positions of the first curtain and the second curtain detected by the position detector before the shutter device is fully opened.

In this configuration, an exposure determining operation can be started by an exposure determining unit without waiting for the shutter device to be in a full open state.

Fourth, fifth and sixth aspects provide a camera body having the same characteristics as those in the first, second and third aspects.

Effect of the Invention

According to the above aspects, in an imaging apparatus or a camera body adopting a focal plane shutter having a first curtain and a second curtain, an operation for capturing an image signal from an imaging sensor, an autofocus operation or an exposure determining operation can be started without waiting for a full open state of an opening of a shutter device. Therefore, the respective operations can be completed at earlier time than a case where the respective operations are started after the opening of the shutter device is fully opened. That is to say, shooting of next frame can be started early at the time of continuous shooting and thus a continuous shooting speed can be improved.

BRIEF DESCRIPTION OF DRAWINGS

FIGS. 6A to 6H are diagrams describing an outline of an operation of a normally open shutter.

FIGS. 7A to 7D are diagrams describing an outline of an operation of a normally open shutter.

FIG. 8 is a timing chart illustrating an operation of a normally open shutter.

BEST MODE FOR CARRYING OUT THE INVENTION

Embodiment

A digital single-lens camera according to an embodiment of the present invention will be described in detail below with reference to the drawings.

1. Configuration

Figure 1:
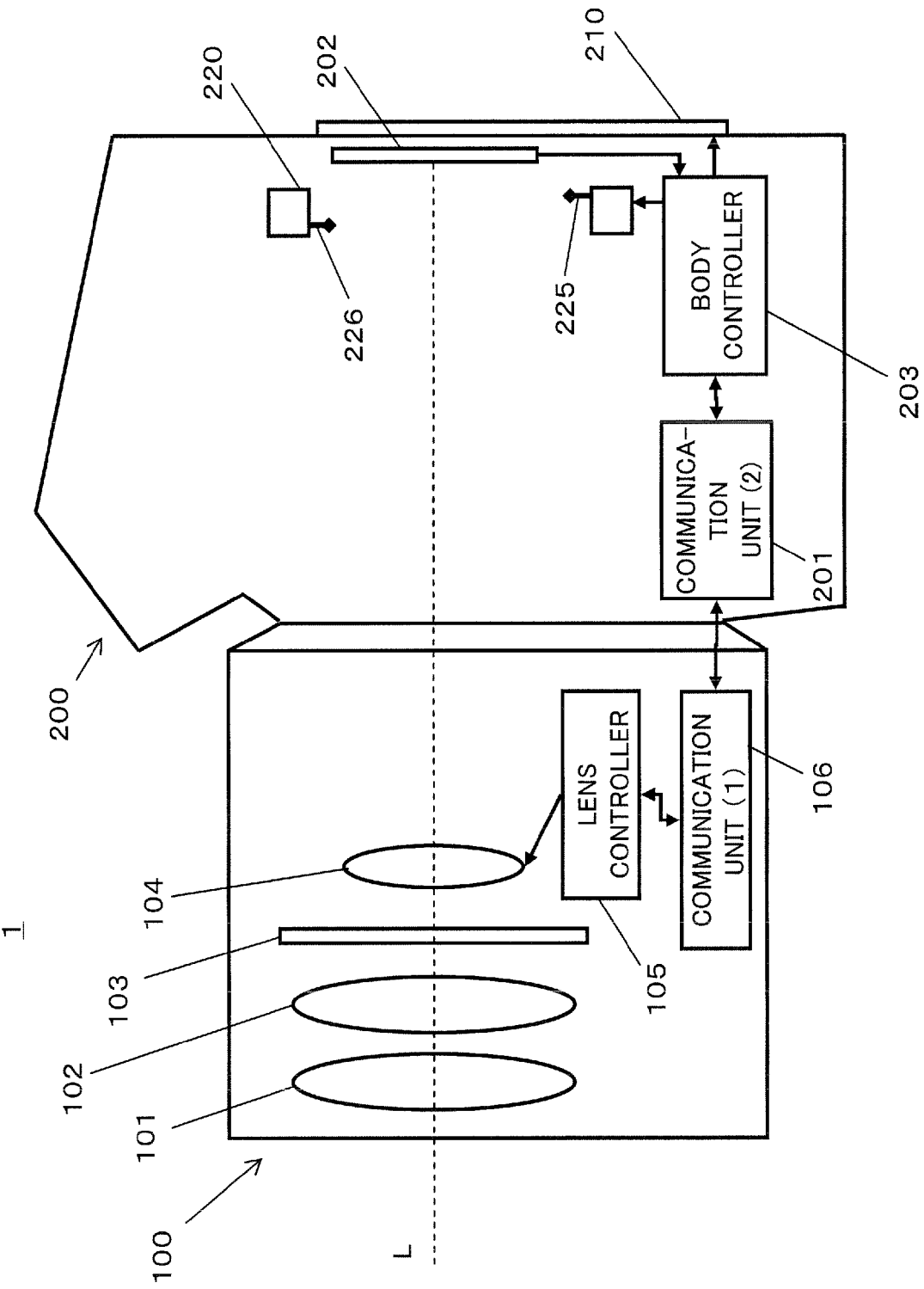
FIG. 1 is a configurational diagram illustrating a digital single-lens camera using a normally open shutter.

FIG. 1 is a configurational diagram illustrating a digital single-lens camera using a normally open shutter according to the embodiment. A digital single-lens camera 1 includes an interchangeable lens 100 and a main body 200. The interchangeable lens 100 can be attached/detached to/from a predetermined position of the main body 200.

1-1. Main Body

The main body 200 has a communication unit (2) 201, an imaging sensor 202, a body controller 203, a normally open shutter 220, and a liquid crystal display monitor 210. The main body 200 further has a release button for instructing a photographing operation from a user and a storage unit for storing image data obtained by the photographing operation, but they are omitted in FIG. 1.

The body controller 203 includes an LSI in which a microcomputer, a control circuit for controlling respective sections of the main body 200 and a signal processing circuit for executing various signal processes are integrated. The body controller 203 controls operations of the respective sections in the main body 200. The body controller 203 outputs a control signal to a lens controller 105 via the communication unit (2) 201 and a communication unit (1) 106. The body controller 203 outputs a vertical synchronizing signal to the imaging sensor 202. The body controller 203 controls an operation of the imaging sensor 202. The body controller 203 converts the image signal output from the imaging sensor 202 into image data as a digital signal. The body controller 203 executes various signal processes such as white balance control. The body controller 203 can output the image data obtained by the various signal processes to the liquid crystal display monitor 210. The body controller 203 controls driving of the normally open shutter 220.

The body controller 203 is the LSI in which the microcomputer, the control circuit for controlling the respective sections of the main body 200 and the signal processing circuit for executing various signal processes are integrated, but may be composed of a plurality of LSIs.

The imaging sensor 202 converts subject light incident via the interchangeable lens 100 into an image signal to output it. The imaging sensor 202 can be composed of a CMOS image sensor or the like.

The liquid crystal display monitor 210 is a display element that can display an image based on image data for display generated by the body controller 203. The display element can be composed of not the liquid crystal display monitor 210 but another display element such as an organic EL display monitor.

The normally open shutter 220 is arranged on a position opposed to an imaging surface of the imaging sensor 202. The normally open shutter 220 can transmit or shield the subject light incident from the interchangeable lens 100 to the imaging sensor 202. The normally open shutter 220 is a focal plane shutter and has a first curtain 225 and a second curtain 226.

The body controller 203 can detect a focus state of the subject light based on contrast of the image signal output from the imaging sensor 202. The detection of the focal point based on the contrast of the image signal output from imaging sensor 202 is referred to as detection of the focal point according to the contrast detecting system.

Figure 2A:
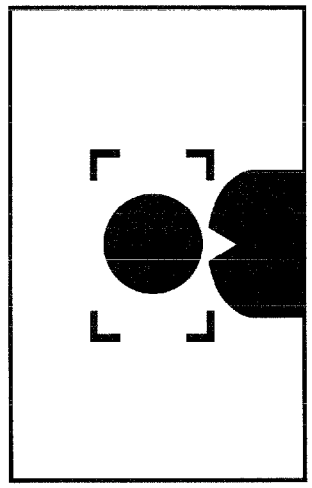
FIGS. 2A to 2C are diagrams describing a system of an autofocus operation.
Figure 2B:
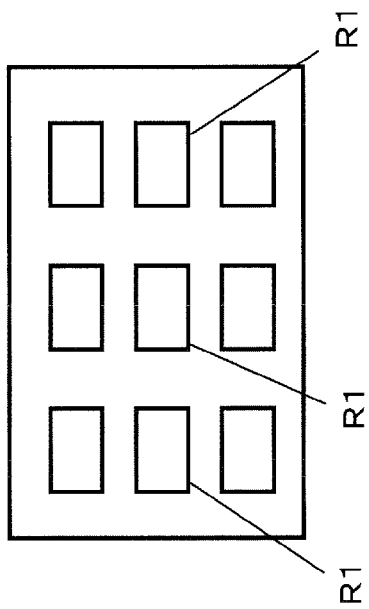
Figure 2C:
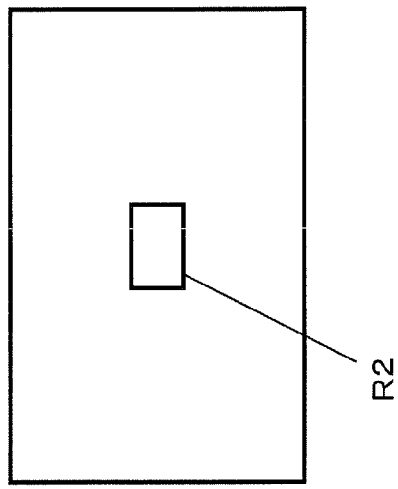

FIGS. 2A to 2C are diagrams describing a system of an autofocus operation. FIG. 2A illustrates an operation of a facial recognition autofocus system for bringing a detected human face into focus when the human face is detected in the image data. FIG. 2B illustrates a nine-point autofocus operation for bringing any one or a plurality of regions in nine regions R1 in the image data into focus. FIG. 2C illustrates a one-point autofocus operation for bringing a region R2 at the center of the image data into focus. The body controller 203 performs the autofocus operation based on any one of the systems.

The body controller 203 can determine an exposure condition optimum for the shooting of an image based on brightness of an image signal output from the imaging sensor 202. The exposure condition is determined by selecting an optimum combination of exposure time for the imaging sensor 202, namely, the exposure time set by running of the first curtain and the second curtain of the normally open shutter 220, a divergence of an iris unit 103, namely, an iris value, a sensitivity of the imaging sensor 202 and a gain of an image signal.

Figure 3C:
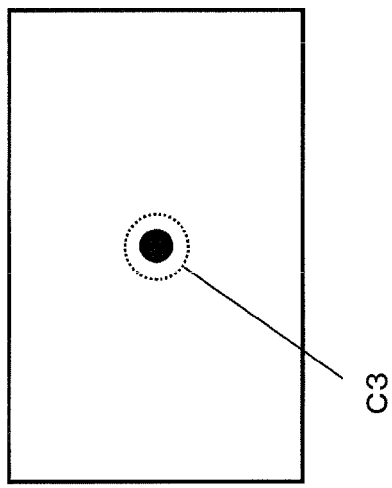
FIGS. 3A to 3C are diagrams describing a system of an exposure control operation.
Figure 3B:
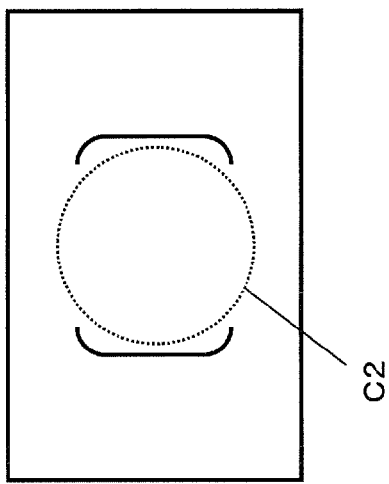
Figure 3A:
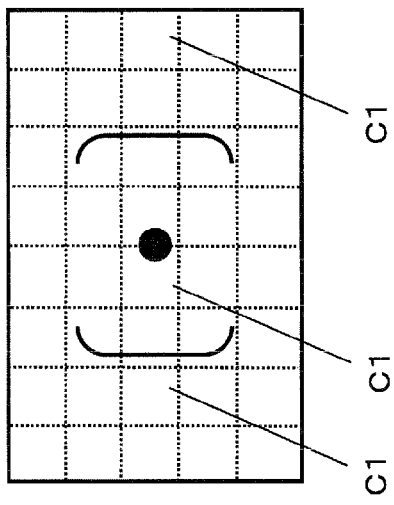

FIGS. 3A to 3C are diagrams describing a system of an exposure control operation. FIG. 3A illustrates a multi metering system for evaluating brightness of entire image data based on brightness of metering regions C1 divided plurally and determining the exposure. FIG. 3B illustrates a center-weighted metering system for evaluating brightness around a predetermined metering region C2 at the center of the image data and determining the exposure. FIG. 3C illustrates a spot metering system for evaluating brightness of a region C3 narrower than the region C2 of the center-weighted metering at the center of the image data and determining the exposure. The body controller 203 performs the exposure control operation based on any one of the systems.

1-2. Interchangeable Lens

With reference to FIG. 1, the interchangeable lens 100 has an objective lens 101, a zoom lens 102, the iris unit 103, a focus lens 104, the lens controller 105, and the communication unit (1) 106. A basic configuration of the interchangeable lens 100 in the digital single-lens camera 1 using the normally open shutter 220 in the embodiment is the same as that in a digital single-lens reflex camera using a normally closed shutter.

The lens controller 105 is composed of an LSI in which a microcomputer and a control circuit for controlling respective sections in the interchangeable lens 100 are integrated. The lens controller 105 receives a reference signal output from the body controller 203 via the communication unit (2) 201 and the communication unit (1) 106. The lens controller 105 can control the focus lens 104 in synchronization with the input reference signal. The lens controller 105 receives an operation request output from the body controller 203 via the communication unit (2) 201 and the communication unit (1) 106. The lens controller 105 can control the zoom lens 102, the iris unit 103 and the focus lens 104 based on the input operation request. The lens controller 105 moves the focus lens 104 forward/backwards in a direction of an optical axis L based on the operation request output from the body controller 203. As a result, the interchangeable lens 100 can focus the subject light onto the imaging sensor 202. The lens controller 105 controls to drive not only the focus lens 104 but also the iris unit 103 and the zoom lens 102, but details are omitted.

The lens controller 105 is the LSI in which the microcomputer and the control circuit for controlling the respective sections in the interchangeable lens 100 are integrated, but may be composed of a plurality of LSIs. The interchangeable lens 100 has a mechanism for detecting blur and a storage unit for storing information specific to the interchangeable lens 100, but they are omitted in FIG. 1.

1-3. Normally Open Shutter

The normally open shutter 220 will be described with reference to FIGS. 4 and 5.

Figure 4:
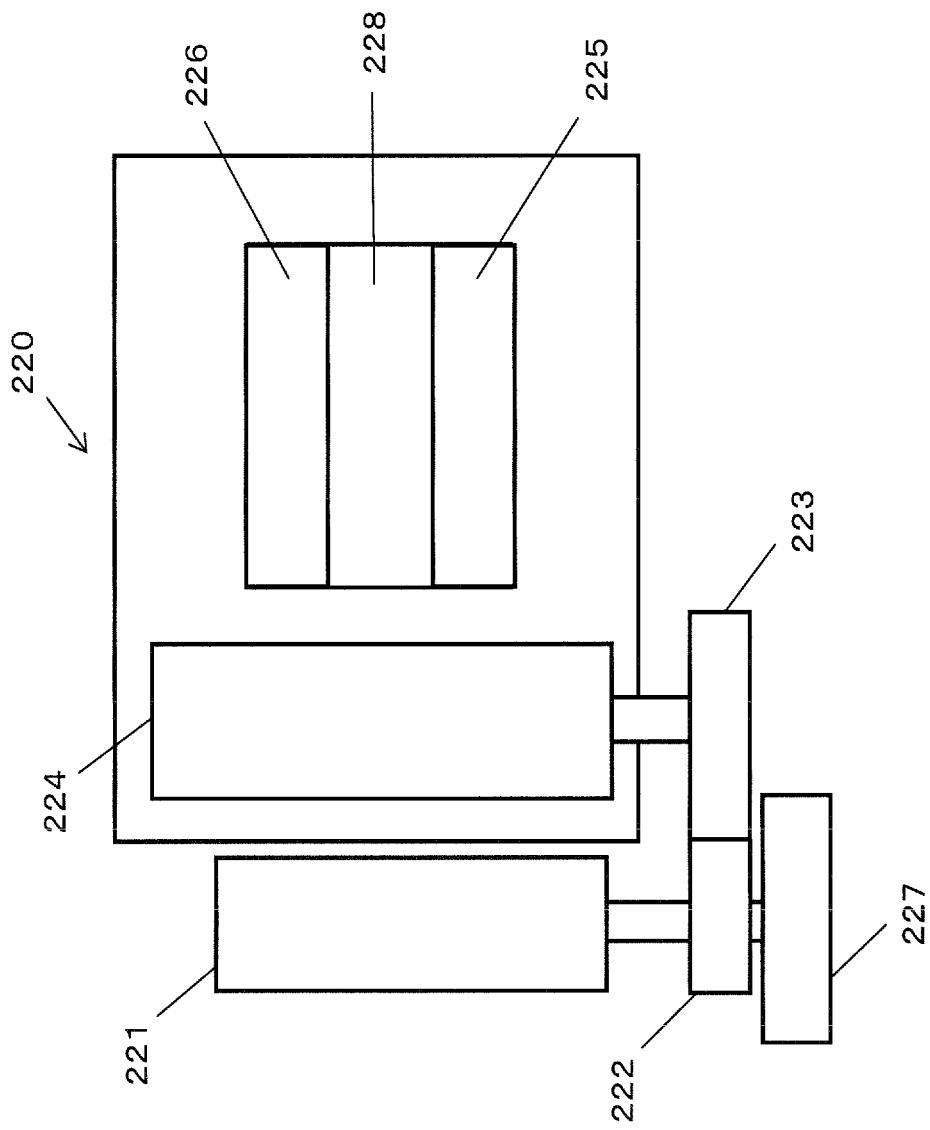
FIG. 4 is an outline view illustrating a normally open shutter.

FIG. 4 is an outline view illustrating the normally open shutter 220. FIG. 4 illustrates the outline of the normally open shutter 220 viewed from a side of the optical axis L.

The normally open shutter 220 has a charge motor 221, a drive gear 222, a reduction gear 223, a driving section 224, the first curtain 225, the second curtain 226, a pulse counter 227 and an opening 228.

A turning force of the charge motor 221 is transmitted to the driving section 224 via the drive gear 222 and the reduction gear 233. The driving section 224 drives the first curtain 225 and the second curtain 226 with a mechanism described later. The pulse counter 227 is provided to a drive shaft of the charge motor 221, and detects a rotation number of the drive shaft or the like. Positions of the first curtain 225 and the second curtain 226 can be obtained based on the detected result of the pulse counter 227. FIG. 4 illustrates a state that only a part of the opening 228 of the normally open shutter 220 is opened.

Figure 5:
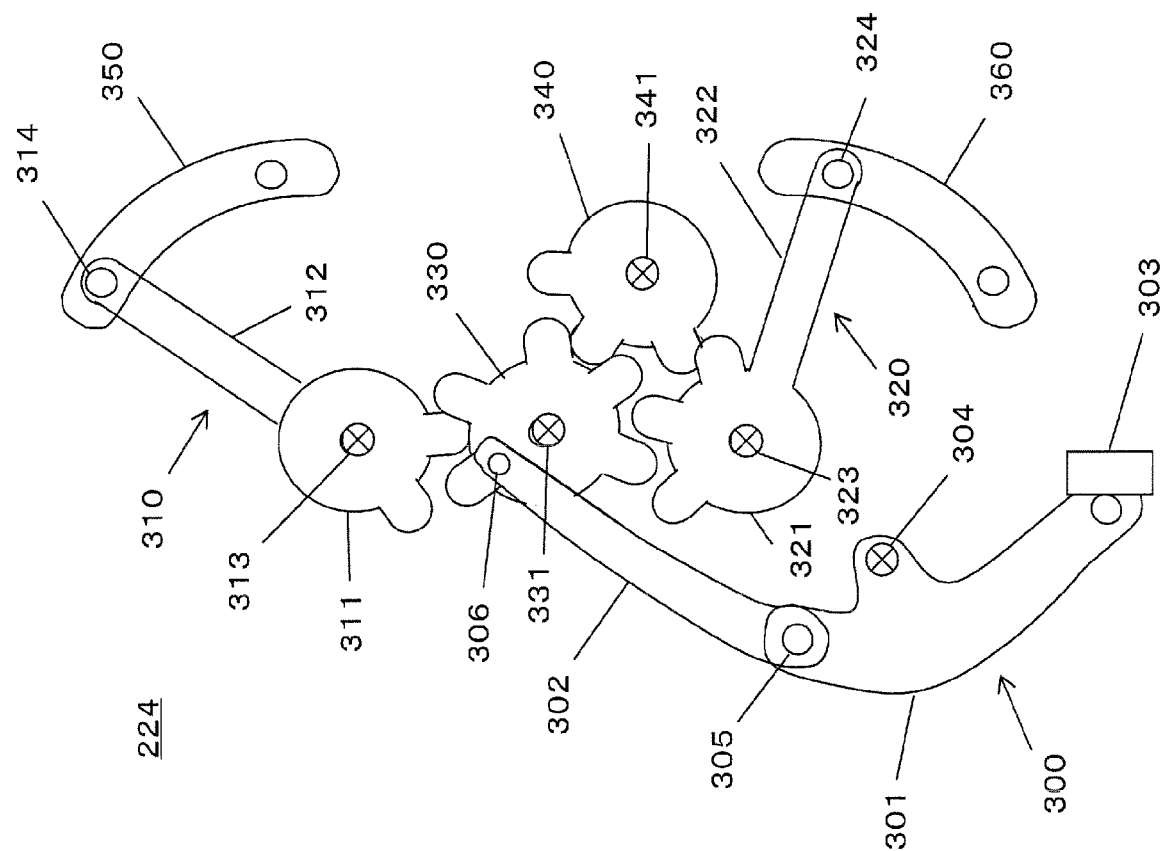
FIG. 5 is a configurational diagram illustrating a driving section of a normally open shutter.

FIG. 5 is a configurational diagram illustrating the driving section 224 of the normally open shutter 220. The normally open shutter 220 has a lever 300, a second curtain drive pin 310, a first curtain drive pin 320, a first cam 330, and a second cam 340.

The lever 300 is configured by connecting a first arm 301 and a second arm 302 rotatably using a connecting pin 305. The first arm 301 is supported rotatably by a fixing pin 304. The second arm 302 is connected rotatably to the first cam 330 by a connecting pin 306. A pressing portion 303 provided to one end of the first arm 301 is pressed and transferred to a left direction in the drawing so that the first cam 330 can be rotated clockwise on a fixing pin 331. The pressing portion 303 is pressed to the left direction in the drawing by a pressing force. This pressing force is obtained by converting the turning force transmitted from the charge motor 221 via the drive gear 222 and the reduction gear 223 using a cam mechanism, not shown. The pressing portion 303 is transferred to the right direction in the drawing by a biasing spring, not shown.

The second curtain drive pin 310 is configured so that a cam section 311 and a pin section 312 are integral. The pin section 312 is connected rotatably to the second curtain 226 by a connecting pin 314. When the first cam 330 rotates on the fixing pin 331, the second curtain drive pin 310 rotates on a fixing pin 313. As a result, the connecting pin 314 transfers along a guide slot 350. In such a manner, the second curtain 226 transfers up and down.

The first curtain drive pin 320 is configured so that a cam section 321 and a pin section 322 are integral. The pin section 322 is connected rotatably to the first curtain 225 by a connecting pin 324. When the first cam 330 rotates on the fixing pin 331 or the second cam 340 rotates on a fixing pin 341, the first curtain drive pin 320 rotates on a fixing pin 323. As a result, the connecting pin 324 transfers along a guide slot 360. In such a manner, the first curtain 225 transfers up and down.

2. Operations 2-1. Operation of Normally Open Shutter

FIGS. 6A to 6H and 7A to 7D are diagrams describing an outline of an operation of the normally open shutter 220. FIG. 6A to 6H are a diagrams illustrating the opening 228 of the normally open shutter 220 viewed from the direction of the optical axis L. FIGS. 6A to 6H are arranged in chronological order. FIG. 6A to 6H illustrates an outline of the normally open shutter 220 in the opened state that sets the exposure time and again returns to the opened state. FIG. 7A to 7D are diagrams illustrating the opening 228 of the normally open shutter 220 viewed from a direction vertical to the optical axis L.

In FIG. 6A, the opening 228 of the normally open shutter 220 is in the opened state. FIG. 7A is a diagram illustrating this state viewed from the direction vertical to the optical axis L. The first curtain 225 is housed in a lower portion of the opening 228 of the normally open shutter 220, and the second curtain 226 is housed in an upper portion of the opening 228 of the normally open shutter 220.

In FIG. 6B, the first curtain 225 starts to transfer towards the upper portion of the opening 228 of the normally open shutter 220.

In FIG. 6C, the first curtain 225 completely shields the opening 228 of the normally open shutter 220. FIG. 7B is a diagram illustrating this state viewed from the direction vertical to the optical axis L.

In FIG. 6D, in order to set the exposure time, the first curtain 225 transfers towards the lower portion of the opening 228 of the normally open shutter 220, and accordingly the second curtain 226 transfers towards the lower portion of the opening 228 of the normally open shutter 220. FIG. 7C is a diagram illustrating this state viewed from the direction vertical to the optical axis L.

In FIG. 6E, the exposure time ends, and the opening 228 of the normally open shutter 220 is completely shielded by the second curtain 226. FIG. 7D is a diagram illustrating this state viewed from the direction vertical to the optical axis L.

In FIG. 6F, in order to bring the normally open shutter 220 into the opened state, the first curtain 225 follows the second curtain 226 to transfer towards the upper portion of the opening 228 of the normally open shutter 220.

In FIG. 6G, the second curtain 226 continuously transfers towards the upper portion of the opening 228 of the normally open shutter 220, but the first curtain 225 starts to transfer towards the lower portion of the opening 228 of the normally open shutter 220. This is because engagement between the cam section 321 of the first curtain drive pin 320 and the first cam 330 is released, and the second cam 340 enters between the cam section 321 of the first curtain drive pin 320 and the first cam 330 so that the first curtain drive pin 320 starts to reverse. In such a manner, the normally open shutter 220 transfers from a vicinity of the center of the opening 228 in the vertical direction to the opened state.

In FIG. 6H, the opening 228 of the normally open shutter 220 is brought into the opened state. This state is the same as the state in FIG. 6A.

2-2. Operation Timing

In the embodiment, the body controller 203 starts to capture an image signal from the imaging sensor 202 at a stage that the normally open shutter 220 transits to the opened state (the state in FIG. 6G), namely, before the opening 228 of the normally open shutter 220 is fully opened. Concretely, in the autofocus operation or the exposure control operation, when the opening 228 of the normally open shutter 220 is opened to a level such that these operations can be started, the capturing of the image signal from the imaging sensor 202 is started, and the autofocus operation and the exposure control operation are started.

A start timing of the autofocus operation will be described. In the digital single-lens camera 1 according to the embodiment, the facial recognition autofocus operation, the nine-point autofocus operation, and the one-point autofocus operation can be performed as the autofocus operation. A stage before the opening 228 of the normally open shutter 220 is fully opened at which the autofocus operation can be started may be varied according to the systems of the autofocus operation. For example, in the facial recognition autofocus operation, when a human face is detected from an image signal obtained through the opening 228 of the normally open shutter 220 before the full-opened state, the facial recognition autofocus operation may be started. Further, in the nine-point autofocus operation, when the opening 228 of the normally open shutter 220 is opened for a range of the region R1 around the center in the vertical direction, the autofocus operation may be started. Further, in the one-point autofocus operation, when the opening 228 of the normally open shutter 220 is opened for a range of the region R4, the autofocus operation may be started. Since the detection region R2 of the one-point autofocus operation is the smallest in the range of the vertical direction in comparison with the regions of the other autofocus operations, the autofocus operation can be started at the earliest time.

The start timing of the exposure control operation will be described. The digital single-lens camera 1 according to the embodiment has the multi metering system, the center-weighted metering system, and the spot metering system as the metering system. A timing at which the metering can be started in the stage before the opening 228 of the normally open shutter 220 is fully opened may be varied according to the metering systems. In the multi metering system, when the opening 228 of the normally open shutter 220 is opened for the range of the region C1 near the center in the vertical direction, the image signal may be read from the imaging sensor 202 so that the exposure control operation is started. In the center-weighted metering system, when the opening 228 of the normally open shutter 220 is opened for the range of the region C2 near the center, the image signal may be read from the imaging sensor 202 so that the exposure control operation is started. In the spot metering system, when the opening 228 of the normally open shutter 220 is opened for the range of the central narrow region C3, an image signal may be read from the imaging sensor 202 so that the exposure control operation is started. Since the detection region C3 of the spot metering system is the smallest in the range of the vertical direction in comparison with the regions of the other metering systems, the exposure control operation can be started at the earliest time.

In the one-point autofocus operation and the exposure control operation of the spot metering system, when a point to be focused and a point to be metered are specified on positions other than the center, the opening 228 of the normally open shutter 220 in a state before the full-opened state can start the one-point autofocus operation or the exposure control operation of the spot metering system at the time when the above specified points are included.

FIG. 8 is a timing chart illustrating an operation of the normally open shutter 220. In FIG. 8, a position of the first curtain 225 is indicated by a solid line, and a position of the second curtain 226 is indicated by a broken line. Further, FIG. 8 illustrates a state that the imaging sensor 202 is being exposing or a state that an image signal is being transmitted.

In a period P1, the first curtain 225 completely shields the opening 228 of the normally open shutter 220. The second curtain 226 is housed in the upper portion of the opening 228 of the normally open shutter 220. In this state, the first curtain 225 and the second curtain 226 are magnetized and fixed respectively by energizing a solenoid coil, not shown. This state is shown in FIGS. 6C and 7B.

In a period P2, the energization of the solenoid coil magnetizing and fixing the first curtain 225 is stopped, and when predetermined time elapses after the stop, the energization of the solenoid coil magnetizing and fixing the second curtain 226 is also stopped. As a result, the first curtain 225 transfers towards the lower portion of the opening 228 of the normally open shutter 220, and accordingly the second curtain 226 follows the first curtain 225 and also transfers towards the lower part of the opening 228 of the normally open shutter 220. At this time, the second curtain 226 is separated from the first curtain 225 by a gap of predetermined amount. This state is shown in FIGS. 6D and 7C. As a result, the exposure time can be set.

In a period P3, the imaging sensor 202 transfers an image signal. At this time, the subject light should not reach the imaging sensor 202, the opening 228 of the normally open shutter 220 is shielded by the second curtain 226. This state is shown in FIGS. 6E and 7D.

In a period P4, in order to bring the normally open shutter 220 into the opened state, the first curtain 225 follows the second curtain 226 to transfer towards the upper portion of the opening 228 of the normally open shutter 220 without a gap therebetween. At this time, the transmission of the image signal from the imaging sensor 202 continues, but since the second curtain 226 and the first curtain 225 transfer without a gap, the subject light is not incident from the opening 228 of the normally open shutter 220. This state is shown in FIG. 6F.

In a period P5, the second curtain 226 continuously transfers towards the upper portion of the opening 228 of the normally open shutter 220, but the first curtain 225 starts to transfer towards the lower portion of the opening 228 of the normally open shutter 220 on the way to transfer towards the upper portion. This is because the engagement between the cam section 321 of the first curtain drive pin 320 and the first cam 330 is released, and the second cam 340 enters between the cam section 321 of the first curtain drive pin 320 and the first cam 330 so that the first curtain drive pin 320 starts to return. In such a manner, the normally open shutter 220 transfers from the center of the opening 228 in the vertical direction to the opened state.

Particularly in the embodiment, the body controller 203 reads an image signal froth the imaging sensor 202 and starts the autofocus operation and the exposure control operation in the middle of the transition to the opened state. Concretely, when the opening 228 is opened by the open amount necessary for the currently set autofocus system and metering system, i.e. predetermined time T elapses after the start of the period P5 as shown in FIG. 8, for example, an image signal is read from the imaging sensor 202 and the autofocus operation and the exposure control operation are started. This state is shown in FIG. 6G. The predetermined time T may be set based on the currently set autofocus system and metering system. For example, in the facial recognition autofocus operation, time required until the detection of a human face from the image signal may be secured at the very least. In the nine-point autofocus operation, time until the opening 228 of the normally open shutter 220 is opened for the range of the region R1 around the center in the vertical direction may be secured at the very least. In the one-point autofocus operation, time until the opening 228 of the normally open shutter 220 is opened for the range of the region R4 may be secured at the very least. In another manner, in the multi metering system, time until the opening 228 of the normally open shutter 220 is opened for the range of the region C1 around the center in the vertical direction may be secured at the very least. In the center-weighted metering system, time until the opening 228 of the normally open shutter 220 is opened for the range of the region C2 around the center may be secured at the least. In the spot metering system, time until the opening 228 of the normally open shutter 220 is opened for the range of the central narrow region C3 may be secured at the very least. When the time required for the autofocus system is different from the time required for the metering system, the longer time of them may be set.

In a period P6, the normally open shutter 220 maintains the opened state. In the period P5, if the autofocus operation and the exposure control operation performed by the body controller 203 are not completed, the opened state of the normally open shutter 220 is maintained in the period P6 until the autofocus operation and the exposure control operation performed by the body controller 203 are completed. This state is shown in FIG. 6H.

The autofocus operation and the exposure control operation performed by the body controller 203 are started at the period P5. As a result, the time required until next shooting can be shortened by the time of the operation at the period P5 in comparison with the case where the autofocus operation and the exposure control operation performed by the body controller 203 are started after the start of the period P6, namely, after the normally open shutter 220 is completely opened.

In a period P7, the first curtain 225 starts to transfer towards the upper portion of the opening 228 of the normally open shutter 220. This state is shown in FIG. 6B. The above same operation is repeated during the continuous shooting. Therefore, the description about the operation during the continuous shooting will be omitted.

3. Conclusion

As described above, in the digital single-lens camera 1 according to the embodiment, the body controller 203 starts to capture an image signal from the imaging sensor 202 before the opening 228 of the normally open shutter 220 is completely opened.

In the digital single-lens camera 1 according to the embodiment, the body controller 203 operates the lens controller 105 before the opening 228 of the normally open shutter 220 is completely opened.

In the digital single-lens camera 1 according to the embodiment, the body controller 203 starts the exposure determining operation before the opening 228 of the normally open shutter 220 is completely opened.

According to the above configuration, in the digital single-lens camera 1 or the main body 200 adopting the normally open shutter 220 having the first curtain 225 and the second curtain 226 (focal plane shutter), the operation for capturing an image signal from the imaging sensor 202, the autofocus operation, and the exposure determining operation can be started without waiting for the full open of the opening 228 of the normally open shutter 220. Therefore, the respective operations can be completed at the earlier time than the case where the respective operations are started after the opening 228 of the normally open shutter 220 is fully opened. That is to say, shooting of next shot can be started earlier at the time of continuous shooting, thereby improving the continuous shooting speed.

Particularly in the focal point detection according to the contrast detecting system, since the imaging, the metering (exposure control operation) and the autofocus operation are performed by using image signals from the one imaging sensor 202, the early completion of the metering and the autofocus greatly contribute to the improvement in the continuous shooting speed in the contrast detecting system. The focal point system utilizing the contrast detecting system can be applied to a wobbling system for detecting a focus position while slightly oscillating to transfer a focus lens to the direction of the optical axis, and a hill-climbing system for transferring the focus lens to the direction of the optical axis to once allowing it to pass through the focus position and detect the focus position, and then returning the focus lens to the focus position.

Another Embodiment

The embodiment have described the normally open shutter 220 that transits from the vicinity of the center in the vertical direction of the opening 228 to the opened state at the time of re-transition to the opened state after the exposure time is set. However, the technical idea of the embodiment can be applied also to the normally open shutter and the normally closed shutter that transit from the lower portion of the opening to the opened state.

In the embodiment, the start timing is changed according to the autofocus system and the exposure control system set by the user. However, in order to improve the continuous shooting speed, predetermined autofocus system and exposure control system may be forcibly set at the time of the continuous shooting. For example, as the autofocus system, the one-point autofocus system that enables the autofocus operation to be completed at the earliest time is set, as the exposure control system the spot metering system that enables the exposure control to be completed at the earliest time may be set.

INDUSTRIAL APPLICABILITY

According to the present invention, the continuous shooting speed can be improved. Therefore, the present invention is effectively applied to the digital single-lens reflex cameras and the digital single-lens cameras adopting the focal plane shutter, and general imaging apparatuses in which optical systems are integral with bodies.

DESCRIPTION OF THE REFERENCE NUMERALS

100: INTERCHANGEABLE LENS
101: OBJECTIVE LENS
102: ZOOM LENS
103: DIAPHRAGM UNIT
104: FOCUS LENS
105: LENS CONTROLLER
106: FIRST COMMUNICATING UNIT
200: CAMERA BODY
201: SECOND COMMUNICATING UNIT
202: IMAGING SENSOR
203: BODY CONTROLLER
210: IMAGE DISPLAY UNIT
220: NORMALLY OPEN SHUTTER
221: CHARGE MOTOR
222: DRIVE GEAR
223: REDUCTION GEAR
224 DRIVING SECTION
225: FIRST CURTAIN
226: THE SECOND CURTAIN
227: PULSE COUNTER
228: OPENING
300: LEVER
301: FIRST ARM
302: SECOND ARM
303: PRESSING PORTION
304: FIXING PIN
305: CONNECTING PIN
306: CONNECTING PIN
310: SECOND CURTAIN DRIVE PIN
311: CAM SECTION
312: PIN SECTION
313: FIXING PIN
314: CONNECTING PIN
320: FIRST CURTAIN DRIVE PIN
321: CAM SECTION
322: PIN SECTION
323: FIXING PIN
324: CONNECTING PIN
330: FIRST CAM
331: FIXING PIN
340: SECOND CAM
341: FIXING PIN
350: GUIDE SLOT
360: GUIDE SLOT

The invention claimed is:

1. An imaging apparatus comprising:
an optical system operable to collect subject light;
an imaging sensor operable to generate an image signal based on the subject light;

a shutter device arranged between the optical system and the imaging sensor, the shutter device including a first curtain and a second curtain and being a normally open type shutter that has a full open state in which an opening of the shutter device is fully opened between shootings;

a position detector operable to detect positions of the first curtain and the second curtain; and a controller operable to start capturing of the image signal from the imaging sensor based on the positions of the first curtain and the second curtain detected by the position detector after the opening of the shutter device starts opening for the full open state and before the opening of the shutter device is fully opened.

2. The imaging apparatus according to claim 1 further comprising a focus unit operable to drive a focus lens based on the image signal;

wherein the controller starts capturing of the image signal from the imaging sensor to operate the focus unit after the opening of the shutter device starts opening for the full open state and before the opening of the shutter device is fully opened.

3. The imaging apparatus according to claim 1 further comprising an exposure determining unit operable to determine exposure based on the image signal;

wherein the controller starts capturing of the image signal from the imaging sensor to operate the exposure determining unit after the opening of the shutter device starts opening for the full open state and before the opening of the shutter device is fully opened.

4. A camera body comprising:

an imaging sensor operable to generate an image signal based on subject light;

a shutter device arranged between an optical system and the imaging sensor, the shutter device including a first curtain and a second curtain and being a normally open type shutter that has a full open state in which an opening of the shutter device is fully opened between shootings;

a position detector operable to detect positions of the first curtain and the second curtain; and a controller operable to start capturing of the image signal from the imaging sensor based on the positions of the first curtain and the second curtain detected by the position detector after the opening of the shutter device starts opening for the full open state and before the opening of the shutter device is fully opened.

5. The camera body according to claim 4 further comprising a focus unit operable to drive a focus lens based on the image signal;

wherein the controller starts capturing of the image signal from the imaging sensor to operate the focus unit after the opening of the shutter device starts opening for the full open state and before the opening of the shutter device is fully opened.

6. The camera body according to claim 4 further comprising an exposure determining unit operable to determine exposure based on the image signal;

wherein the controller starts capturing of the image signal from the imaging sensor to operate the exposure determining unit after the opening of the shutter device starts opening for the full open state and before the opening of the shutter device is fully opened.

* * * * *